United States Patent [19]
Stevens

[11] Patent Number: 5,638,706
[45] Date of Patent: Jun. 17, 1997

[54] SECURING MECHANISM

[76] Inventor: Roberto Antonius Martinus Stevens, 30B Sunbrae Grove, Mount Maunganui, New Zealand

[21] Appl. No.: 539,111

[22] Filed: Oct. 4, 1995

Related U.S. Application Data

[63] Continuation of Ser. No. 197,295, Feb. 16, 1994, abandoned.

[51] Int. Cl.$^6$ .................................................. E05B 73/00
[52] U.S. Cl. ........................... 70/19; 292/256.6; 70/235; 70/227; 248/316.6
[58] Field of Search .......................... 292/256.6; 70/14, 70/19, 233–35, 229, 225–27; 248/74.4, 67.7, 316.8, 316.6, 49

[56] References Cited

U.S. PATENT DOCUMENTS

| | | | |
|---|---|---|---|
| 3,515,398 | 6/1970 | Thompson | 403/391 |
| 3,843,083 | 10/1974 | Angibaud | 248/229 |
| 3,877,622 | 4/1975 | McLain | 224/42.03 B |
| 3,931,919 | 1/1976 | Gerber et al. | 248/316.8 |
| 3,934,436 | 1/1976 | Candlin et al. | 70/234 |
| 3,964,610 | 6/1976 | Deiner | 211/5 |
| 3,970,196 | 7/1976 | Legge | 70/19 |
| 3,981,491 | 9/1976 | Snyder | 269/64 |
| 4,081,118 | 3/1978 | Mason | 224/42.1 G |
| 4,096,715 | 6/1978 | Lipschutz | 70/19 |
| 4,273,465 | 6/1981 | Shoen | 403/391 |
| 4,433,786 | 2/1984 | Wahl | 211/5 |
| 4,459,833 | 7/1984 | Waterkamp et al. | 70/233 |
| 4,622,833 | 11/1986 | Shepherd | 70/226 |
| 4,912,949 | 4/1990 | Bauers | 70/19 |

*Primary Examiner*—Rodney M. Lindsey
*Assistant Examiner*—Monica E. Millner
*Attorney, Agent, or Firm*—Fried, Frank, Harris, Shriver & Jacobson

[57] ABSTRACT

This invention relates to a securing mechanism in the form of a clamp, said securing mechanism also incorporating a locking mechanism which when in locked form prevents the clamp from being readily opened. In preferred embodiments the securing mechanism is in the form of a clamp comprising at least two retaining members, a translation means associated with the two retaining members, a handle containing a locking mechanism attached to said translation means, characterised in that the handle can be moved by the translation means to secure the retaining members with respect to each other, and when the locking mechanism is activated on the handle ready movement of the handle and subsequent release of the retaining members is prevented. The securing mechanism provides a secure means by which valuable articles can be held.

7 Claims, 3 Drawing Sheets

SECURING MECHANISM

This is a continuation of application Ser. No. 08/197,295, now abandoned filed Feb. 16, 1994, entitled Securing Mechanism.

TECHNICAL FIELD

This invention relates to a securing mechanism.

BACKGROUND ART

Reference throughout this specification will be made to the use of the present invention with respect to a device for securing objects such as bicycles to vehicles. It should be appreciated however that the principles of the present invention can be applied to other situations as well and it will be suitable for securing objects to other devices, buildings and so forth.

Clamps are securing mechanisms which are well known and generally consist of two retaining members (usually in the form of bars) capable of holding an object between them. The securing of an object is usually effected by a screw thread which winds one retaining member towards another. Clamps are useful as they can hold an object firm with minimum wear and tear. Unfortunately clamps are not generally security proof and the threads can be readily un-wound to move the retaining members away from each other and the object removed from the clamp.

This is obviously an undesirable situation if valuable objects (such as bicycles) are desired to be retained in a position for some time and left unattended.

We now refer specifically to problem associated with bike racks.

There are a number of bike racks available which attach to the tow ball of a car or even on to the boot of a car.

Previously, bike racks have had brackets which fit under the frame of a bicycle to support same. Bikes are usually held into position while travelling by elastic cords and the like.

This method has a number of disadvantages. One disadvantage is that there is usually only two pressure points on the bicycle which provides significant wear and tear on the frame of the bicycle. A further disadvantage is that it can be fiddly and time consuming to tie the bicycle to the bike rack. Yet another problem is that the bike is not securely attached to the bike rack and can be readily stolen therefrom. This is a further disadvantage as usually insurance companies require some proof of security.

There are a number of bike racks disclosed in U.S. Patent Specifications. Hills' Bicycle Support Rack (U.S. Pat. No 4,821,890) relates to a bicycle rack which may be attached to a wall to enable a bicycle to be supported above the ground. This invention does not include a means of clamping the bicycle to the rack, nor any local means to ensure the security of the bicycle.

Gelinas' Ceiling Rack (U.S. Pat. No. 4,840,278) relates to a ceiling rack upon which a number of bicycles may be supported. As in Hills rack, this invention does not include any means of clamping or locking the bicycle to the rack.

Wahl's Bicycle Rack (U.S. Pat. No. 4,433,786) relates to a bicycle rack which is secured to the ground and which enables bicycles to be leaned and locked against it. Again, no clamping means or inbuilt locking means for bicycles is disclosed in this specification.

Snyder's Work Stand for Bicycles (U.S. Pat. No. 3,981, 491) relates to a bicycle stand which includes a clamping means to secure the bicycle to the stand. No means of locking the damp is disclosed.

Legge's Method of Securing a Bicycle on a Bicycle Rack (U.S. Pat. No. 3,970,196) relates to a attachment which allows bikes to be secured on traditional bicycle racks. This attachment may be locked by a means of a padlock or similar conventional locking means. No method of clamping the bicycle to the rack is disclosed, and the apparatus does not include an inbuilt locking mechanism.

Deiner's Bicycle Rack (U.S. Pat. No. 3,964,610) relates to a bicycle rack with two adjacent walls and a arm means inside the walls which may be used to lock the bicycle into he rack. No clamps are disclosed for clamping the bicycle onto the rack, and this rack is no portable in any sense.

Candlin's Bicycle Parking Standard (U.S. Pat. No. 3,934, 436) relates to a post, clamping means and extendable rope by which a bicycle my be locked to the post. Although a clamp is disclosed, this clamp does not include any inbuilt locking means, and this standard cannot be used for transporting the bicycle. Bergeron's Bicycle Locking Device (U.S. Pat. No. 3,917,138) relates to a locking attachment which may be used in conjunction with a standard bicycle rack. No clamps are disclosed in this specification, and there is no inbuilt locking means for the apparatus.

McLains' Bicycle Rack (U.S. Pat. No. 3,877,622) relates to a rack which may be attached to the bumper of a car and folded to allow access to the boot of the car when the rack is not in use. No inbuilt locking means is disclosed for ensuring the security of the bicycle.

It is an object of the present invention to address the foregoing problems or at least to provide the public with a useful choice.

Further aspects and advantages of the present invention will become apparent from the ensuing description which is given by way of example only.

DISCLOSURE OF INVENTION

A securing mechanism for securing an object to be secured to a vehicle, comprising:

a first portion including a substantially angled support having primary locking means positioned towards one end of the support for securing the support to a vehicle, the first portion having both a translational means and a lower elongate retaining member having a longitudinal axis positioned towards the opposite end of the support from the primary locking means, the lower elongate retaining member being capable of retaining an elongate object having a longitudinal axis such that the longitudinal axis of the object is substantially parallel to the longitudinal axis of the elongate retaining member;

a second portion including an upper elongate retaining member and an arm substantially perpendicular to the upper member, said arm provided with an aperture capable of receiving the translational means of the support of the first portion;

a handle, movement of said handle being capable of allowing movement of the second portion up or down the translational means of the first portion, and said handle including secondary locking means;

the secondary locking means capable of engaging with the handle to selectively allow or disallow movement of the second portion with respect to the first portion, thereby retaining or releasing an elongate object retained between the lower elongate member of the first portion and the upper elongate member of the second portion.

According to an aspect of the present invention there is provided a securing mechanism in the form of a clamp, said securing mechanism also incorporating secondary locking means which when in locked form prevents the clamp from being readily opened.

It can be seen that the present invention provides a secure means of retaining articles so that unauthorised removal of an article from the camp is prevented or made difficult on account of the incorporation of the secondary locking secondary means.

According to another aspect of the present invention, there is provided a securing mechanism in the form of a clamp comprising at least one upper and one lower elongate retaining member, a translation means associated with the two retaining members, a handle containing a secondary locking means attached to said translation means, characterised in that the handle can be moved by the translation means to secure the upper and lower retaining members with respect to each other, and when the secondary locking means is activated on the handle ready movement of the handle and subsequent release of the retaining members is prevented.

The translation means may be in preferred embodiments a screw thread, however it should be appreciated that the translational means may be any other mechanism which allows the handle to be moved to secure the upper and lower retaining members with respect to each other.

For example, the translational means may in other embodiments be a bayonet mechanism so that the handle secures the upper and lower retaining members through a push-fit action. In alternate embodiments the translational means may be a ratchet mechanism which only allows movement of the handle in one direction until released by the locking mechanism. Alternate embodiments are also envisaged.

It should be appreciated that more than two retaining members may be used. For example, there may be provided a number of sets of retaining members in opposing pairs. In preferred embodiments there is one or two pairs of opposing retaining members each pair including an upper and a lower retaining member.

The retaining members may come in a number of forms. In one embodiment, the retaining members may have sloping sides which meet to an apex in substantially the vertical axis. The pairs of retaining members may be orientated so that they form mirror images along the horizontal axis with the apexes furthermost distance apart. This allows the retaining members to hold articles of differing sizes. For example, if an article of a small diameter is required to be held, the upper and lower retaining members can be moved close together with the sides and apexes of the retaining members acting to grip the article. If an article of a larger size is required to be held, then the retaining members can be moved apart to accommodate same as the diverging sides can still grip the article at their distal ends.

In preferred embodiments, the retaining members have gripping means associated with them. This gripping means may come in a number forms, for example serrated teeth, adhesive tape and so forth. However, with articles such as bicycles which have a quality surface finish, it is desirable that the gripping means does not mark the surface. Therefore a gripping mean in the form of rubber or some other resilient material or material having a high co-efficient friction is preferred.

The secondary locking means may come in a variety of forms. In a preferred embodiment, the secondary locking means may comprise of a lock which can be pushed into an aperture to set the lock, but only can be withdrawn upon use of a key, a dialled combination, or some other specialist mechanism.

It can be seen that the present invention overcomes difficulties associated with the prior art. A locking means which is directly associated with the mechanism that screws up the clamp is an elegant solution to problems associated with securing a damp.

The configuration of the securing mechanism may come in a variety of forms. In one embodiment, the screw thread which forms part of the translational means may be a threaded rod extending from the support of the first portion which supports the lower retaining member or members. This rod may pass through an aperture of the arm of the second portion of the securing mechanism which holds fie opposing upper retaining member or members. The handle/ locking mechanism may be complimentarily threaded and attached to the screw thread passing through the aperture of the arm of the second portion.

Rotation of the handle on the screw thread in one direction can remove it from the screw thread, allowing the arm which holds the upper retaining member (of the second portion) to be moved along the screw thread away from the support of the first portion which supports the lower retaining member, thus separating the pair or pairs of retaining members. This allows the article to be removed from the clamp.

Rotation of the handle in the opposite direction screws it onto the screw thread and can be used to bear against the second portion of the securing mechanism which in turn bears against the support of the first portion of the securing mechanism. This holds the upper and lower retaining members together to provide a clamping action. Activating the locking means ensures that the retaining members are held in this position until the secondary locking means is released.

In alternate embodiments, there may be provided a threaded bush within the support of the first portion of the securing mechanism and a complimentarily threaded rod may extend from the handle through both the arm of the second portion and the support of the first portion.

There may be provided a nut or other type of stop on the threaded rod so that the second portion is held between the handle and the nut. With this embodiment unscrewing of the handle can cause the second portion to lift with the handle, thus separating the upper and lower retaining members. This provides a number of advantages over the previously described mechanism as there is now a single action to lifting the upper and lower retainer members apart whereas beforehand, first the handle was required to be unscrewed with respect to the screw thread and then the arm of the second portion was also required to be unscrewed with respect to the screw thread.

It should be appreciated that other arrangements of the present invention are also envisaged.

The present invention can be used in a variety of situations. In a preferred embodiment of the present invention, a clamp as described above will be used in relation to securing objects, including bicycles to supports including a bike rack. The support, or bike rack, is in turn secured to another object, for example to a vehicle, via the tow ball of the vehicle.

Although the bicycles nay be securely locked with respect to the bike rack, there is still the problem of ensuring that the bike rack is securely locked to the vehicle. Conventional bike racks have been attached to the tow balls of the cars by having two screws which push against the tow ball. To remove the bike rack, the screws are unscrewed therefrom and the bike rack lifted off the tow ball. This also allows the bike rack to be readily stolen from a vehicle.

According to an alternate aspect of the present invention, there is provided a primary locking means for securing the support to the tow ball of a vehicle characterised in that there is provided a primary locking means which pushes in to lock the support into position under the tow ball of a vehicle and which can only be unlocked from said position by the use of s specialist tool.

The support in preferred embodiments will be a bike rack, but may find use other devices such as various brackets for dog boxes and the like.

In most embodiments, the specialist tool will be a traditional key, however other specialist tools may be used.

It can be seen that the present invention overcomes the problems relating to bike racks discussed previously. There is now provided a secure and relatively easy means which a bike can be secured with respect to a bike rack. Further, using a clamp ensures there are no isolated pressure points and thus less wear and tear. A clamp is also less fiddly to operate. Another advantage is that a mechanism as described provides the proof of security required by insurance companies.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
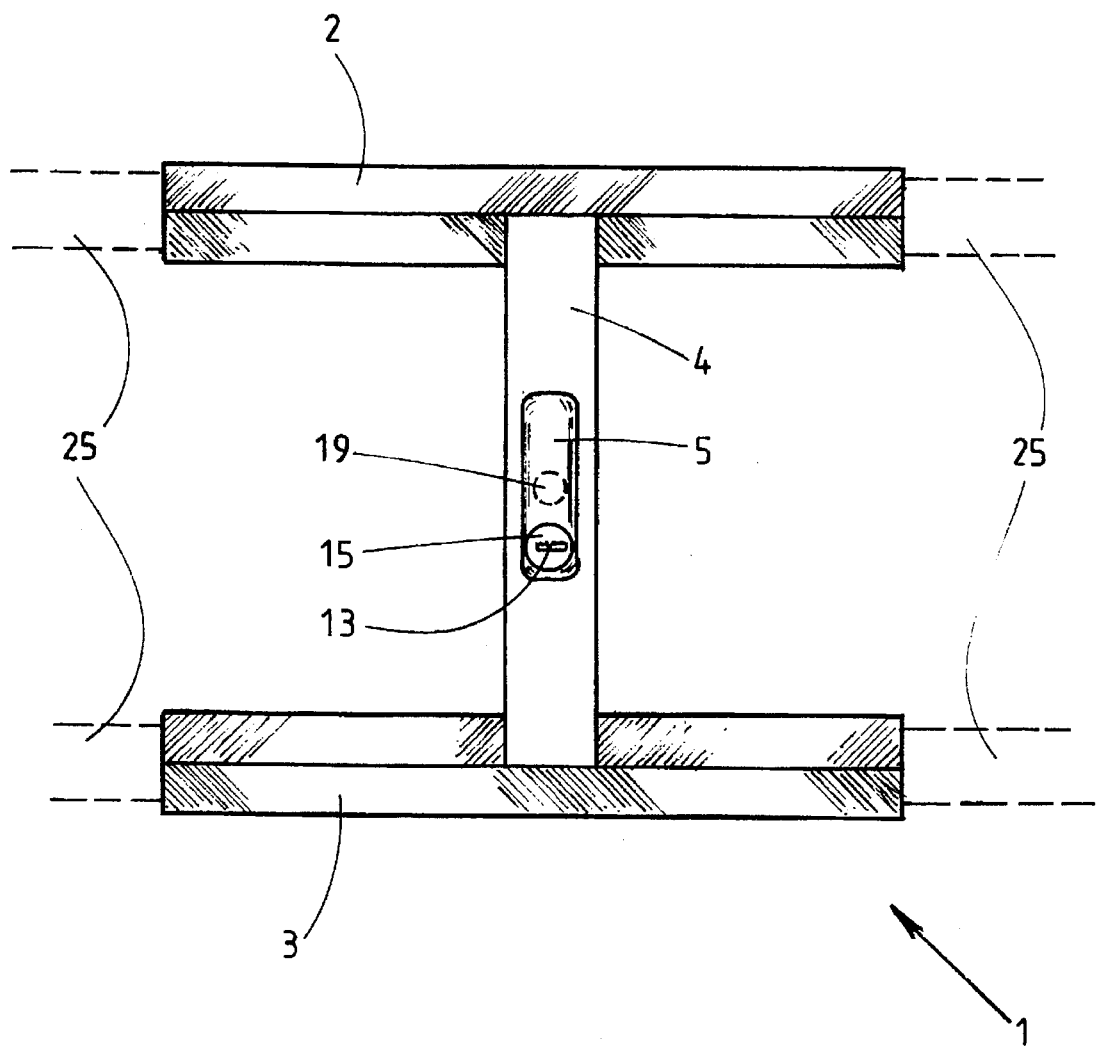
FIG. 1 is a diagrammatic top view of a second portion of the securing mechanism in accordance with one embodiment of the present invention.
Figure 2:
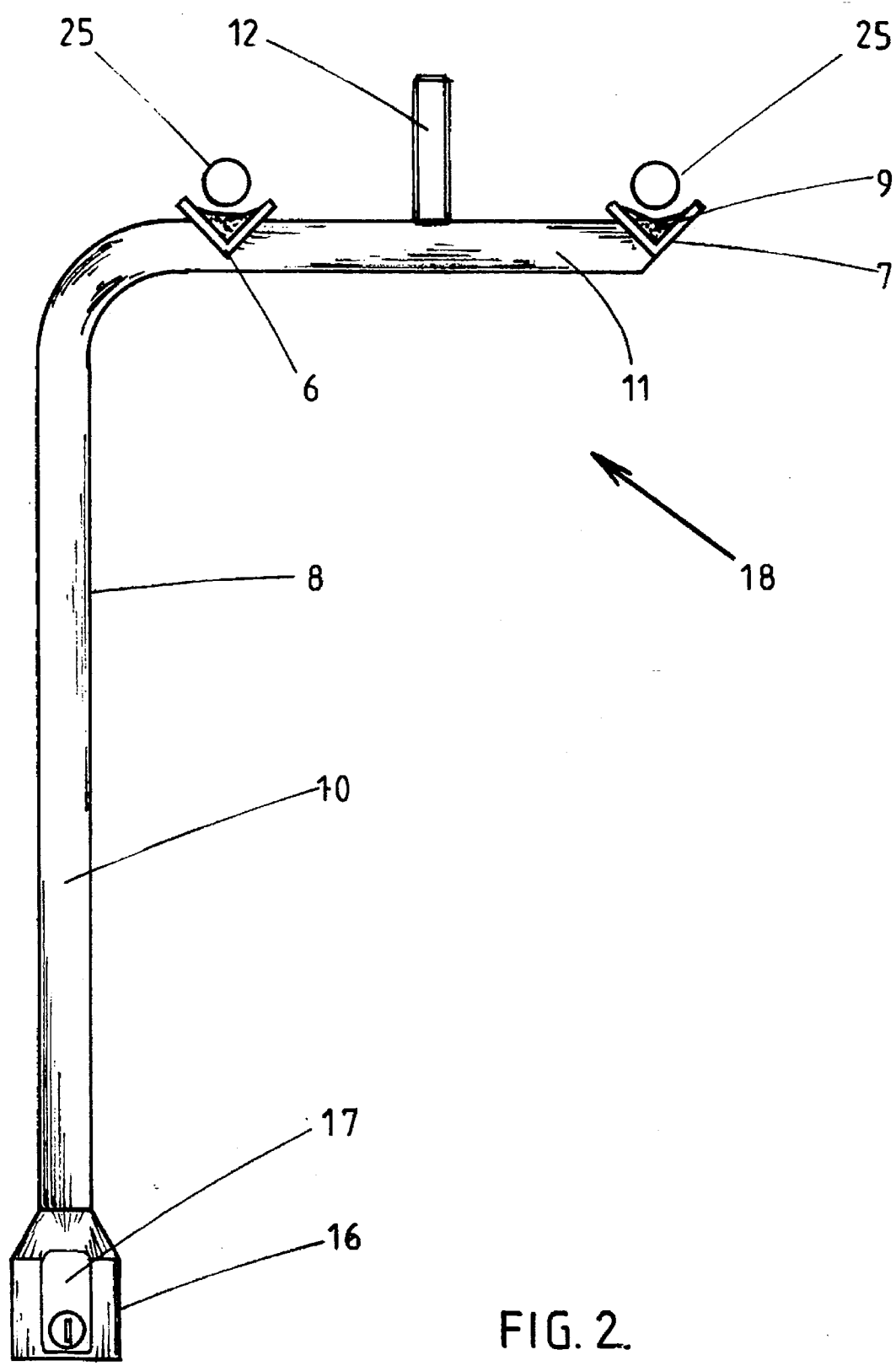
FIG. 2 is a diagrammatic cross-sectional view of a bike rack in accordance with one embodiment of the present invention.

With respect to FIG. 1, there is provided the second portion of a securing mechanism generally indicated by arrow 1. The second portion 1 of the securing mechanism has been designed for use with a bike rack first portion generally indicated by arrow 18 including a support 8, such as a; 8 as illustrated in cross-section in FIG. 2.

The second portion 1 of the securing mechanism; is designed to accommodate two bicycles by having two upper elongate retaining members in the form of bars 2 and 3. The bars 2 and 3 are connected by an arm or cross-bar 4 which is substantially perpendicular to the bars 2 and 3. The cross-bar 4 has an aperture 19 into which is fitted secondary locking means 15 included in the handle 5.

The upper bars 2 and 3 are made from angle iron and have gripping means in the form of rubber molds 9 fitted thereinto. The size and shape of the upper bars 2 and 3 are such that each upper bar 2 and 3 can readily fit over the elongate portion 25 of a bicycle frame. The longitudinal axis of the elongate portion 25 of the bicycle frame is accordingly substantially parallel to the longitudinal axis of each elongate upper bar 2 and 3.

Complementary lower retaining members or bars 6 and 7 are present on the first portion 18 of the securing mechanism; and can fit under the elongate portion 25 of a bicycle frame. Similarly, the longitudinal axis of the elongate portion 25 is substantially parallel to the longitudinal axis of the elongate lower bars 6 and 7.

It can be seen that the combination of the upper bars 2 and 3 and lower bars 6 and 7 with the rubber moulds 9 ensure that there are multiple pressure points with respect to the bike frame thus providing less wear and tear than with previous bike racks.

The first portion 18 of the securing mechanism includes the substantially angled bike rack 8.

The bike rack 8 comprises an upright shaft 10 which angles to provide a substantially horizontal shaft 11. The lower bars 6 and 7 are fitted into the horizontal shaft or bar 11.

Translational means in the form of screw thread or bolt 12 is fixed to the shaft 11 and passes through the aperture 19 on the cross-bar 4. The handle 5 including the secondary locking means 15 threads onto the bolt 12. It can be seen that this arrangement and construction allows the handle 5 including secondary locking means 15 to act as a handle and to screw down the second portion 1 of the securing mechanism towards the first portion 18 of the securing mechanism and hence the upper bars 2 and 3 with respect to the lower bars 6 and 7 on the bike rack 8.

Once the second portion 1 has been screwed sufficiently down, the secondary locking means 15 can then be pushed into the aperture 19 in the cross-bar 4. The push action activates the handle 5 so that the handle 5 cannot be unscrewed and lifted upwards from the cross-bar 4, hence securing the second portion 1 of the securing mechanism to the first portion 18 of the securing mechanism.

To release the second portion 1, a key is required to be inserted into the keyhole 13 on the secondary locking means 15. Turning the key enables the secondary locking means 15 to be released and handle 5 can again be used for unscrewing the secondary portion.

It can be seen that the present invention provides a relatively simple means by which objects can be readily secured between lower retaining members 6 and 7 and upper retaining members 2 and 3 of the securing mechanism. The upper and lower members effectively operating as a clamp.

The bottom end of the upright shaft 10 of a bike rack 8 has a sleeve 16 which fits over a tow ball (not shown) on a vehicle. Two locking screws (not shown) pass through the sleeve 16 and press against the tow ball and prevent the bike rack from rocking. Primary locking means 17 (operating similarly to secondary locking means 15) also passes through the sleeve 16 and fits in under the tow ball. The primary locking means 17 holds the bike rack 8 secure with respect to the tow ball when pushed in. To release the primary locking means 17, a key is required to be used.

Figure 3:
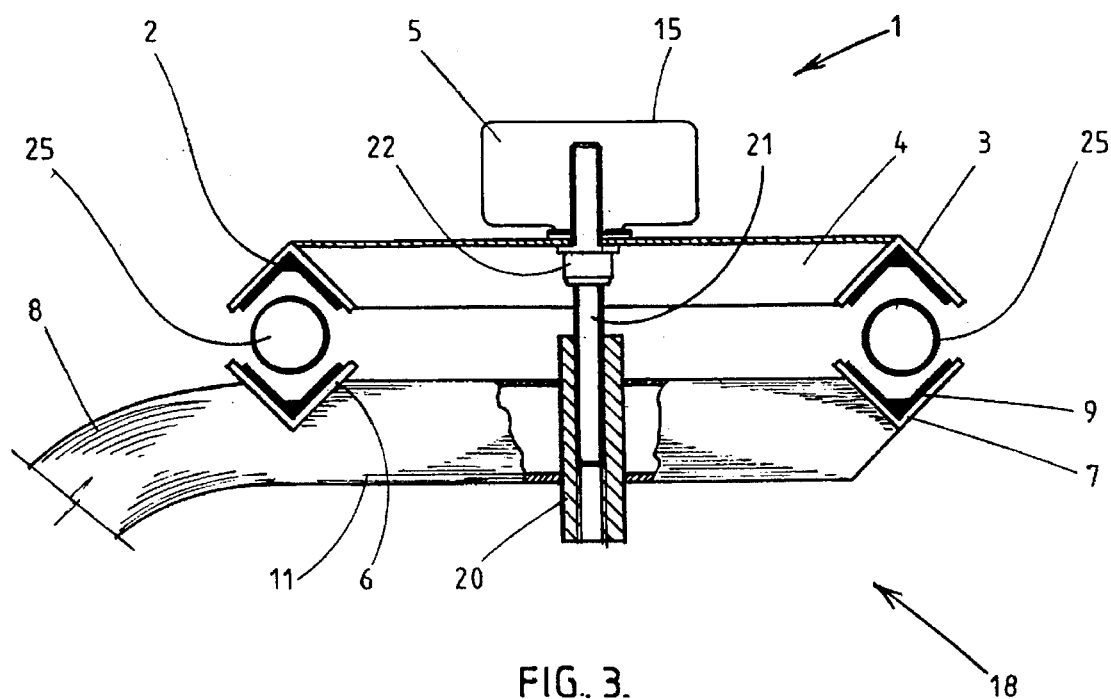
FIG. 3 is a diagrammatic cross-sectional view in part of a bike rack in accordance with an alternate embodiment of the present invention.

FIG. 3 illustrates an alternative securing mechanism to that illustrated in FIG. 1. In this embodiment, there is a threaded bush 20 which passes through the shaft 11. The handle 5 (including secondary locking means 15) is fixed to a complimentary threaded rod 21 which passes through the cross-bar 4 and is threaded into the bush 20. The cross-bar 4 is secured between the handle 5 and a stop in the form of a nut 22 which is wound onto the threaded rod 21.

To move the cross-bar 4 apart from the shaft 11, the handle 5 is unscrewed with respect to the bush 20. The provision of the nut 22 means that both the handle and the cross-bar 4 are lifted away from the shaft 11 in the one action. It can be seen that this is an elegant improvement over the previous method which required two separate actions to move the cross-bar 4 away from the shaft 11.

It should be appreciated that the present invention can be applied to clamping mechanisms which can be used in different situations other than for bike racks.

Aspects of the present invention have been described by way of example only and it should be appreciated that modifications and additions may be made thereto without departing from the scope thereof as defined in the appended claims.

What is claim is:

1. A securing mechanism for securing an object to be secured to a vehicle, comprising:
   a first portion including a substantially angled support having primary locking means positioned towards one end of the support for securing the support to a vehicle, the first portion having both a translational means and a lower elongate retaining member having a longitudinal axis positioned towards the opposite end of the support from the primary locking means, the lower elongate retaining member being capable of retaining an elongate object having a longitudinal axis such that the longitudinal axis of the object is substantially parallel to the longitudinal axis of the elongate retaining member;
   a second portion including an upper elongate retaining member and an arm substantially perpendicular to the upper member, said arm provided with an aperture capable of receiving the translational means of the support of the first portion;
   a handle, movement of said handle being capable of allowing movement of the second portion up or down the translational means of the first portion, and said handle including secondary locking means;
   the secondary locking means capable of engaging with the handle to selectively allow or disallow movement of the second portion with respect to the first portion, thereby retaining or releasing an elongate object retained between the lower elongate member of the first portion and the upper elongate member of the second portion.

2. A securing mechanism as claimed in claim 1 wherein the translation means is in the form of a screw thread.

3. A securing mechanism as claimed in claim 1 wherein the upper and lower retaining members have sloping sides which meet at an apex in a substantially vertical axis.

4. A securing mechanism as claimed in claim 1 wherein the handle may be moved relative to the translational means to raise or lower the upper retaining member with respect to the lower retaining member.

5. A securing mechanism as claimed in claim 1 wherein the secondary locking means comprises a lock which can be inserted into an aperture to set the lock, but can only be withdrawn upon use of a specialist mechanism.

6. A securing mechanism as claimed in claim 2 wherein the translation means is in the form of a threaded rod fixed to the handle, and the threaded rod is complimentarily threaded with respect to a threaded bush held within the support of the first portion.

7. A securing mechanism as claimed in claim 2 wherein the translation means is a threaded rod extending from a shaft and the handle is complimentarily threaded and attachable to the threaded rod.

* * * * *